US012652448B2

(12) United States Patent
Cappiello et al.

(10) Patent No.: US 12,652,448 B2
(45) Date of Patent: Jun. 9, 2026

(54) PRESSURE TOLERANT CAMERA

(71) Applicant: Massachusetts Institute of Technology, Cambridge, MA (US)

(72) Inventors: Gregory Cappiello, Windham, NH (US); George Turner, Lexington, MA (US); Brian Edwards, Sterling, MA (US); Emma Landsiedel, Arlington, MA (US); Ryan Little, Worcester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 133 days.

(21) Appl. No.: 18/405,303

(22) Filed: Jan. 5, 2024

(65) Prior Publication Data

US 2024/0236451 A1      Jul. 11, 2024

Related U.S. Application Data

(60) Provisional application No. 63/478,553, filed on Jan. 5, 2023.

(51) Int. Cl.
| | |
|---|---|
| *H04N 23/51* | (2023.01) |
| *B63G 8/00* | (2006.01) |
| *G02B 7/182* | (2021.01) |
| *G02B 27/00* | (2006.01) |
| *H04N 23/12* | (2023.01) |

(Continued)

(52) U.S. Cl.
CPC ............. *H04N 23/51* (2023.01); *B63G 8/001* (2013.01); *H04N 23/12* (2023.01); *H04N 23/57* (2023.01); *H04N 23/64* (2023.01);

*B63G 2008/004* (2013.01); *G02B 7/182* (2013.01); *G02B 27/0012* (2013.01)

(58) Field of Classification Search
CPC .............. B63G 2008/004; B63G 8/001; G02B 27/0006; G02B 27/0012; G02B 7/182; H04N 23/12; H04N 23/51; H04N 23/55; H04N 23/57; H04N 23/64
See application file for complete search history.

(56) References Cited

U.S. PATENT DOCUMENTS

| | | | |
|---|---|---|---|
| 7,751,697 B2 | 7/2010 | Gourova | |
| 8,875,645 B1 * | 11/2014 | Webb | ..................... G01C 13/00 441/32 |

(Continued)

FOREIGN PATENT DOCUMENTS

WO      WO 2019/129872      7/2019

OTHER PUBLICATIONS

Duerr et al., "Freeform imaging systems: Fermat's principle unlocks "first time right" design"; Duerr and Thienpont, *Light: Science & Applications* (2021)10:95; May 2021 (12 pages).

(Continued)

*Primary Examiner* — Amy R Hsu
(74) *Attorney, Agent, or Firm* — Daly, Crowley, Mofford & Durkee, LLP

(57) ABSTRACT

According to some embodiments, a pressure tolerant camera system includes: an enclosure filled with an incompressible fluid and having a viewport through which light can pass; a digital image sensor provided within the enclosure; and a plurality of mirror lenses provided within the enclosure and arranged to reflect light from the viewport onto the digital image sensor.

20 Claims, 8 Drawing Sheets

(51) Int. Cl.
  *H04N 23/57* (2023.01)
  *H04N 23/60* (2023.01)

(56) References Cited

U.S. PATENT DOCUMENTS

| | | | | |
|---|---|---|---|---|
| 9,225,883 | B2 | 12/2015 | Kossin | |
| 9,576,553 | B2 * | 2/2017 | Pauly | G02B 27/095 |
| 9,638,836 | B1 * | 5/2017 | Harrison | G02B 27/0172 |
| 10,437,943 | B2 | 10/2019 | Chrisp | |
| 2017/0150015 | A1 * | 5/2017 | Salazar | G01F 17/00 |
| 2017/0242941 | A1 * | 8/2017 | Chrisp | G06F 30/20 |
| 2018/0180877 | A1 * | 6/2018 | Hou | G02B 17/0642 |
| 2019/0124273 | A1 * | 4/2019 | Liebetraut | G02B 13/08 |
| 2019/0361501 | A1 * | 11/2019 | Park | H04N 23/45 |
| 2021/0063683 | A1 * | 3/2021 | Nikolov | G02B 7/182 |
| 2021/0096337 | A1 * | 4/2021 | Yang | G02B 13/0065 |
| 2021/0208387 | A1 * | 7/2021 | Karam | G03B 5/00 |
| 2022/0035153 | A1 * | 2/2022 | Zhuang | G02B 3/0081 |
| 2024/0118534 | A1 * | 4/2024 | de Mersseman | G02B 27/0006 |

OTHER PUBLICATIONS

Chrisp et al., "Imaging freeform optical systems designed with NURBS surfaces"; Optical Engineering, vol. 55(7), 071208; Jul. 2016 (8 pages).

Laudo et al., "Liquid-filled underwater camera lens system"; Proc. SPIE 3482, International Optical Design Conference; Sep. 1998 (6 pages).

Jamieson et al., "HADEEP: Free-Falling Landers to the Deepest Places on Earth"; Marine Technology Society Journal, vol. 43, No. 5; Winter 2009 (10 pages).

Hardy et al., "Hadal Landers: the Deepsea Challenge Ocean Trench Free Vehicles"; 2013 Oceans—San Diego; Sep. 2013 (10 pages).

Burgess, "'Dark Ships' Emerge From the Shadows of the Nord Stream Mystery"; Wired.com, available online at: https://www.wired.com/story/nord-stream-pipeline-explosion-dark-ships/; Nov. 2022 (6 pages).

"HADAL Lander B"; HADES, HADal Ecosystem Studies, available online at: https://web.whoi.edu/hades/hadal-lander-b/; Dec. 2022 (5 pages).

"Moore Nanotech 350FG; Ultra-Precision Freeform Generator"; Nanotech, Moore Nanotechnology Systems, LLC; Jan. 1, 2023; (1 page).

* cited by examiner

100

402b

404a

402a

404a

PRESSURE TOLERANT CAMERA

CROSS-REFERENCE TO RELATED APPLICATIONS

This application claims the benefit under 35 U.S.C. § 119 of U.S. Provisional Patent Application No. 63/478,553 filed on Jan. 5, 2023, which is hereby incorporated by reference herein in its entirety.

STATEMENT REGARDING FEDERALLY SPONSORED RESEARCH

This invention was made with government support under FA8702-15-D-0001 awarded by the U.S. Air Force. The government has certain rights in the invention.

BACKGROUND

The challenge of operating at required depths is significant. For every 10 meters of ocean depth, the surrounding pressure increases by approximately 1 atmosphere. Thus, for a candidate depths of 2000 meters, the pressure reaches roughly 200 atmospheres or 3,000 PSI. This can crush objects not specifically designed to withstand such pressures. However, the need to monitor undersea assets is broad given the expense and environmental impact of such underwater catastrophes as the Deepwater Horizon leak. Numerous critical assets often go unmonitored in the deep ocean, as present unmanned underwater vehicles (UUVs) are typically expensive and have significant size, weight, and power (SWaP). Current underwater monitoring equipment is expensive due to structural requirements of pressure vessels to protect electronics and optics. Moreover, operational expenses can be high due to the need for support vessels.

SUMMARY

According to embodiments of the present disclosure, an underwater imaging camera system can operate while directly submerged at deep-sea underwater pressures (i.e., without the need of a surrounding enclosure to maintain pressure substantially lower than ambient deep-sea underwater pressure). This removes the need for bulky, heavy pressure vessels and allows for significant reducing in system size, weight, and cost. Disclosed camera systems mimic the operation of the eye of deep-sea creatures which operate at ambient pressures and, thus, may be referred to herein as "fisheye" cameras.

In some embodiments, a pressure tolerant camera system for deep-sea imaging may include one or more of the following components: navigation platform, power supply, camera, optics, an illumination source, communications, buoyancy engine, position/navigation sensors, and a microcontroller. In some embodiments, a pressure tolerant camera may be equipped with onboard artificial intelligence (AI) capabilities to perform classification and aid in autonomous decision-making using camera-acquired data.

To operate at extreme deep-sea pressure (e.g., pressures found within the Hadal zone beginning at 6,000 meters below the ocean surface), disclosed embodiments eliminate air/glass interfaces employed in a traditional optical lens to properly refract light. Instead, a unique two-element mirror lens system with a large horizontal field-of-view (HFOV) may be employed. Reflective mirrors may be submerged in an incompressible fluid/liquid (e.g., mineral or silicone oil) to perform the optical focus power and is thus pressure insensitive and tolerant. This approach eliminates the need for a bulky pressure vessel and expensive multi-element refractive camera lenses, while providing for increased field-of-view (FOV) among other advantages.

Disclosed embodiments may be deployed for various underwater applications including but not limited to well head inspection and surveillance, undersea telecommunications cable inspection and surveillance, ship hull inspection, port monitoring, fishery/lobster trap inspection, and pipeline and other system surveillance. Moreover, because disclosed camera systems are generally immune from defocus at different altitudes, they may be advantageously used within terrestrial, airborne, and space applications as well.

According to one aspect of the disclosure, a pressure tolerant camera system includes: an enclosure filled with an incompressible fluid and having a viewport through which light can pass; a digital image sensor provided within the enclosure; and a plurality of mirror lenses provided within the enclosure and arranged to reflect light from the viewport onto the digital image sensor.

In some embodiments, at least one of the plurality of mirror lenses can have a freeform optical surface. In some embodiments, the freeform optical surface can include at least one of: high-order asymmetrical polynomials; non-uniform rational basis spline (NURBS); or other mathematical representation of odd-even mirror symmetry. In some embodiments, the plurality of mirror lenses may include two mirror lenses both having a having a freeform optical surface. In some embodiments, the two mirror lenses may be configured to perform optical focus power. In some embodiments, one or more of the plurality of mirror lenses may be formed of a metal, glass, or ceramic.

In some embodiments, the incompressible fluid can be transparent in a visible light waveband. In some embodiments, the incompressible fluid may be one of distilled water, ethanol, food-grade mineral oil, silicone oil, or an engineered fluid.

In some embodiments, the system can further include a support structure to hold the mirrors in place. In some embodiments, the mirror lenses and the support structure may be formed of a common material. In some embodiments, the common material can be aluminum.

In some embodiments, the plurality of mirror lenses may be substantially insensitive to a refractive index of the incompressible fluid.

In some embodiments, the camera system may also include a controller configured to execute one or more artificial intelligence (AI) algorithms. In some embodiments, the AI algorithms may be operable to recognize one or more underwater objects. In some embodiments, the camera system may include a memory and the controller may be configured to store, to the memory, image data obtained from the plurality of mirror lenses and image sensor in response to recognition of specific underwater objects.

In some embodiments, the camera system may include an anti-biofouling module configured to generate ultraviolet (UV) light for inhibiting biofouling of the viewport. In some embodiments, the enclosure may have a flexible rubber membrane to equalize pressure between the enclosure filled with the incompressible fluid and an external environment.

According to another aspect of the disclosure, a pressure tolerant camera system includes: an enclosure configured to be filled with an incompressible fluid and having a viewport through which light can pass; and a plurality of freeform mirror lenses provided within the enclosure and arranged to reflect light from the viewport onto a digital image sensor.

According to another aspect of the disclosure, an unmanned underwater vehicle (UUV) can include: a pressure tolerant camera system having one or more freeform mirror lenses and a digital image sensor all provided within a fluid-filled enclosure; and a controller configured to make autonomous decisions regarding operation of the UUV using data generated by the pressure tolerant camera system.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Figure 1:
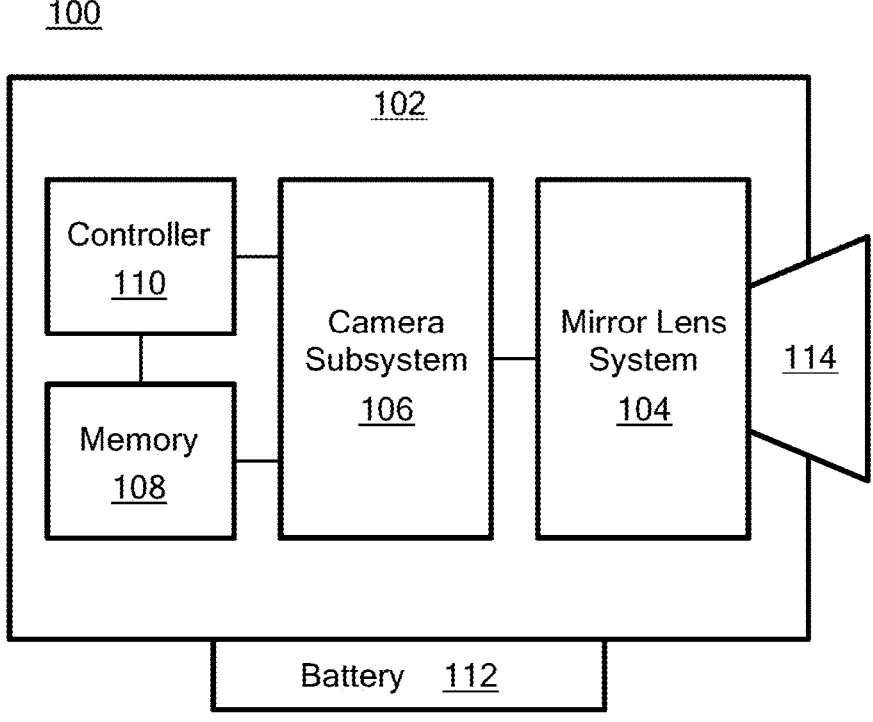
FIG. 1 is a block diagram of a pressure tolerant camera system, according to embodiments of the present disclosure.

FIG. 1 shows an example of a pressure tolerant camera system 100, according to embodiments of the present disclosure. System 100 includes a fluid-filled enclosure 102 within which is provided a mirror lens system 104, a camera subsystem 106, a memory 108, and a controller 110 (e.g., a microcontroller). In the example of FIG. 1, camera subsystem 106, memory 108, and controller 110 may be powered by a battery 112 located outside the enclosure 102 (e.g., affixed to an outside surface of the enclosure). In other embodiments, a battery may be provided within the fluid-filled enclosure 102. In some cases, battery 112 may include one or more lithium-polymer (LiPo) battery cells. In yet other embodiments, these components may be powered by an external power source, such as power received over a cable or tether.

Enclosure 102 may be filled with an incompressible fluid that is transparent/transmissive in waveband of interest, i.e., a band of light desired to be captured by the camera. Likewise, viewport 114 may be formed of a material that is transparent/transmissive in waveband of interest. For underwater imaging, the visible light waveband is generally of interest due to the absorption of water. In some embodiments, silicone oil may be selected as the immersion fluid and fused silica or sapphire as the viewport material. In some embodiments, the incompressible fluid may be, for example, distilled water, ethanol, food-grade mineral oil, silicone oil, or an engineered fluid (i.e., a fluid not found in nature of distilled therefrom, such as NOVEC 7100 Engineered Fluid).

Lens system 104 can include two freeform mirrors submerged within the incompressible fluid. As used herein, the term "freeform mirror" refers to a mirror having a freeform surface, meaning a surface whose surface shape lacks translational or rotational symmetry about axes normal to the mean plane. An viewport 114 (or "window") may be provided to allow light to enter lens system 104. The two freeform mirrors may be aligned to reflect the light onto camera subsystem 106. The mirrors may be mounted on a rigid structure (e.g., steel structure) to maintain optical alignment. Lens system 104 may be aligned to provide, for example, 20-degree diagonal field-of-view and fast F/2.5 aperture stop. In some cases, it may be designed to cover the entire field of an off-the-shelf image sensor, such as the SONY IMX477, which is a 12.3 mega-pixel complementary metal-oxide-semiconductor (CMOS) image sensor. In some cases, such a wide-field and large aperture reflective design may be enabled using freeform mirror shapes. Examples of freeform mirror shapes, mirror alignments, and mounting structures are described in detail below.

Camera system 100 may be deployed in various environments, such as underwater, terrestrial, airborne, or space. Thus, enclosure 102 may be surrounded by various types of media such as seawater at various pressures, air at various pressures, or a vacuum. The use of reflective mirrors submerged in an incompressible fluid to perform the optical focus power results in a camera that is pressure insensitive and tolerant (i.e., maintains focus when directly exposed to various ambient pressures including extreme pressures). Moreover, by eliminating refracting surfaces, the optical system is insensitive to the refractive index of the surrounding media.

Camera subsystem 106 may include an image sensor, such as a CMOS image sensor, a charge-coupled device (CCD) image sensor, or other type of digital image sensor. Camera subsystem 106 may be realized as one or more integrated circuits (ICs) mounted on a printed circuit board (PCB) that is arranged within enclosure 102 to receive light reflected by the lens system 104. In some embodiments, the image sensor PCB may be mounted on the same rigid structure as mirror lens system 104. In some cases, an off-the-self sensor such as the SONY IMX477 may be used.

In addition to the image sensor, electronics within camera subsystem 106 can include clock circuitry to drive the image sensor and readout electronics to read the data off the image sensor. This data can be either be stored in memory 108 and/or transmitted via Universal Serial Bus (USB), Ethernet, fiber optic or other protocol in real time. In some embodiments, camera system 100 can include hardware and/or software configured for communicating over USB, Ethernet, fiber optic, etc. In some embodiments, controller 110 may provide one or more I/O adapters and software to interface therewith.

Memory 108 can be configured to storage image data generated by camera subsystem 106. Memory 108 can include one or more non-volatile memory devices such as non-volatile random-access memory (NVRAM), Flash memory, or the like. In some cases, memory 108 may be configured to store machine-executable instructions (code) that can be executed by controller 110, along with data associated with the execution of that code. For example, memory 108 may be configured to store code/data associated with one or more AI algorithms.

Controller 110 may be provided as a general-purpose or special-purpose microcontroller implemented as an IC. In some cases, memory 108 and controller 110 can be mounted on a PCB that interfaces with camera subsystem 106 via a signal path (e.g., a flexible PCB connector).

In some embodiments, one or more electronics boards provided within fluid-filled enclosure 102 may be treated with an acrylic or urethane conformal coating spray. While most surface mount electronic components can natively survive at high pressure, in some cases custom high pressure tolerant capacitors and/or oscillators may be used in place of conventional electrolytic capacitors and crystal oscillators.

It should be appreciated that, by filling enclosure 102 with an incompressible fluid, there is no implosion hazard as there will be no large entrapped gaseous volumes. The acoustic signature will be low as the volume will be better acoustically impedance matched to its surroundings (e.g., to seawater). By enclosing the optics in a fluid, there will be no imparted shear forces between dissimilar materials when the volume encounters compressive forces, all forces will be isostatic. In some embodiments, enclosure 102 can be made to flex in non-critical regions to equalize internal and external forces.

Figure 2:
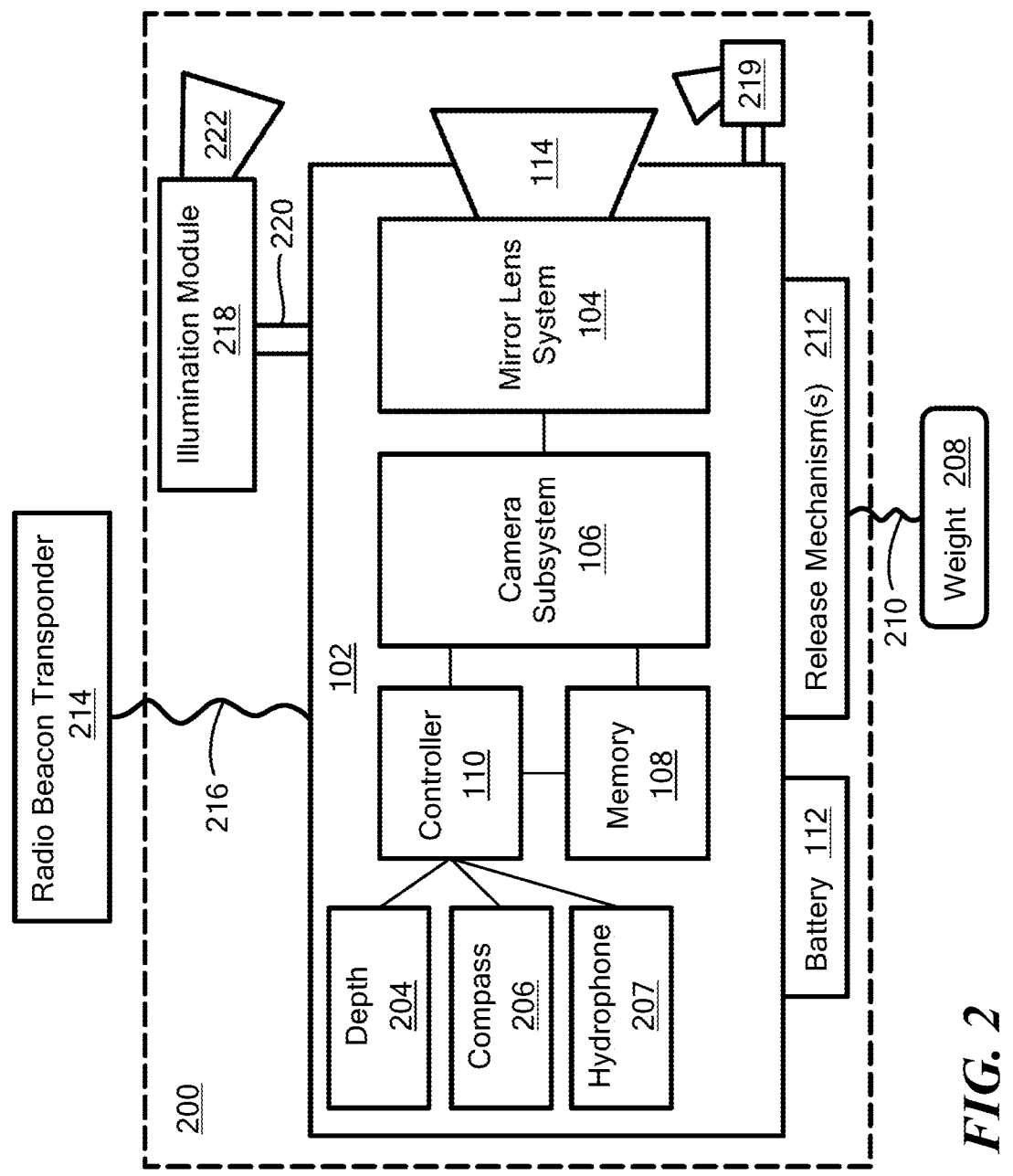
FIG. 2 is a block diagram of a pressure tolerant camera system for deep ocean imaging, according to some embodiments.

FIG. 2 shows an example of a pressure tolerant camera system 200 for deep ocean imaging, according to some embodiments. Like elements of FIG. 1 are shown using like reference numerals in FIG. 2, and aspects of those elements previously described may apply here as well.

Illustrative system 200 includes fluid-filled enclosure 102 within which is provided mirror lens system 104, camera subsystem 106, memory 108, and controller 110. Optionally, a depth sensor 204, compass 206, and/or hydrophone 207 may be provided within enclosure 102, as shown, or outside the enclosure. System 200 further includes battery 112 that may be affixed to an outside surface of fluid-filled enclosure 102, one or more release mechanisms 212, an illumination module 218 attached to fluid-filled enclosure 102 via a boom 220, and an anti-biofouling module 219 (which may be provided outside the enclosure, as shown, or inside the enclosure). A weight 208 may be attached to the fluid-filled enclosure 102 via a tether 210 and the one or more release mechanisms 212. The camera system 200 can be coupled to a radio beacon transponder 214 coupled via another tether 216.

In some embodiments, controller 110 can receive depth data from depth sensor 204 and heading data from compass 206 (e.g., a digital compass) and use this data to tag images captured by the camera. In some embodiments, controller 110 can receive acoustic data from hydrophone 207 and implement acoustic triggering whereby the camera system 200 captures images when a specific sound profile is recognized, as discussed further below.

In some embodiments, camera system 200 may be configured for use as a deep-sea lander (e.g., a Hadal lander), meaning it is submerged to the ocean floor using weight 208, collects data at the bottom for some period of time, and then the release mechanisms 212 detaches the weight's tether 210 to float up to the ocean surface for data collection (e.g., to retrieve image data recorded to memory 108). Here, one or more buoyancy elements may be attached to, or provided within, the fluid-filled enclosure 202. Release mechanisms

212 can include, for example, one or more active release mechanisms (e.g., an acoustically triggered release mechanism) and one or more passive/failsafe release mechanisms (e.g., a galvanic timed-release mechanism that operates based on metal corroding at a predictable rate). In such lander applications, radio beacon transponder 214 and tether 216 may be omitted.

In some embodiments, camera system 200 may be configured to operate at depths between the ocean surface and floor. In such embodiments, radio beacon transponder 214 may be designed to float about the ocean surface and receive collected image data from camera system 200 via tether 216, which may include a fiber optic cable for example. Radio beacon transponder 214 can then wirelessly transmit the collected data to a remote location, such as a ship or a land-based observatory (e.g. via a satellite communications link). Alternatively or additionally, the pressure tolerant camera can be tethered to an autonomous surface sail drone, durable surface platform, sea ice, coral reef, etc. In such cases, weight 208 and release mechanism 212 may be omitted.

In some embodiments, camera system 200 may be mounted to an unmanned underwater vehicle (UUV) for free exploration. In such cases, weight 208 and release mechanism 212 may be omitted and the radio beacon transponder 214 may be optionally omitted. Further, the UUV may provide a depth sensor, compass, and/or hydrophone and, in this case, elements 204, 206, and/or 207 shown in FIG. 2 may be omitted and camera system 200 may obtain the same information from the UUV.

In some embodiments, camera system 200 may operate with a duty cycle, such as 10% to 20% duty cycle. That is, camera system 200 may switch between a first state (e.g., a low-power/standby mode where image data is not collected and/or transmitted) and a second state (e.g., an operational mode where image data is collected and/or transmitted). Such switching may occur periodically, e.g., based on clock signal or other timing input, or may occur in response to a triggered input. In some embodiments, camera system 200 may be operated as a type of underwater "trail cam." That is, it may automatically collect and/or transmit data in response to one or more triggers, such as an acoustic trigger or a particular type of object detected using image recognition (as discussed further below).

Illumination module 218 can provide illumination for deep-sea imagine operations. In more detail, illumination module 218 can include one or more lighting elements arranged to emit light 222 (e.g., white light) in the direction of underwater objects to be imaged. In some cases, illumination module 218 may include a laser array (e.g., a 455 nm laser array) for long distance illumination. Other types of lighting elements, such as light-emitting diodes (LEDs) or a flashlamp, may be used. While FIG. 2 shows illumination module 218 being attached to the relatively close to enclosure 102 via boom 220, in other embodiments illumination module 218 may be located further away from the camera to reduce the backscatter problem in underwater imaging situations. For example, the length of boom 220 may be increased, or illumination module 218 may be attached by a tether. In some cases, illumination module 218 may be attached to a UUV, which may be the same UUV that the camera is attached to or another UUV operating proximate to the camera's UUV.

In some embodiments, a pressure tolerant camera system (such as illustrated in FIG. 1 or FIG. 2) may be configured to utilize AI functionality to assist with the collection of image data. This may be particularly advantageous when operating in environments where it is challenging to exfiltrate data captured by the camera due to significant distances and/or limited bandwidth connections (e.g., deep-sea, space, etc.). Similar to consumer-oriented security cameras that can recognize people and objects at the camera itself, such functionality can be incorporated into a pressure tolerant camera system to enable in-situ decision making.

As previously mentioned, controller 110 may execute one or more AI algorithms using code and/or data stored in memory 108. Alternatively or additionally, controller 110 may include or otherwise utilize a special purpose AI processor, system-on-a-chip (SoC), or system-on-a-module (SoM). For example, controller 110 may include an AI vision processor such as provided by AMBARELLA, a TensorFlow-enabled processor such as provided by GOOGLE/CORAL, an AI engine/stack provided by QUAL-COMM, etc. In some cases, the pressure tolerant camera system may include one or more microcontrollers capable of executing a TensorFlow-based AI engine, such as Raspberry Pi microcontrollers. One or more computer trained vision models, such as MobileNet or EfficientDet, can be provided for execution by the AI engine. Such models may be stored in onboard memory 108, for example. An AI processor can interface with camera subsystem 106 to directly receive image data and/or can read image data stored to onboard memory 108.

An onboard AI algorithm/processor may be trained to recognize, from among captured image data, different types of objects of interest. Controller 110 can use this capability to make autonomous, in-situ decisions such as determining which data should be stored to memory 108 versus which data should be discarded, when to exfiltrate the data by surfacing or other method, and/or when to execute docking or capture actions. In applications where the camera system is attached to a UUV, image recognition on data generated by a pressure tolerant camera can be used to for autonomous, in-situ decisions regarding the UUV's operation, such autonomously redirecting the UUV's navigation path, changing the UUV's attitude for camera pointing/shot acquisition, and accomplishing complex tasks such as inspecting oil well seals, capturing a submerged object in need of rescue, emptying a lobster trap. In some cases, a trained onboard AI can be used to recognize objects, recognize anomalies in system operations, and/or following a specific object in an underwater group. Given the long period of time to surface from deeper regions of the ocean and the difficulty of sending large amounts of data from the ocean depths, such functionality can prove invaluable for many time-critical operations.

As illustrated in FIG. 2, a pressure tolerant camera system can include an anti-biofouling module 219 to produce ultraviolet (UV) illumination aimed at the camera viewport 114 to prevent biofouling thereof. Illumination in the range 250 nm to 280 nm (UV-C) may be used to inhibit biofouling by interrupting the colonization of bacteria and diatoms that form a biofilm on undersea surfaces. For example, integrated doses of >20 J/cm UV light—whether continuous low intensity or periodic high intensity—can be used to inhibit biofouling. As one example, anti-biofouling module 219 can include a LUMINOUS DEVICES 270 nm LED on a metal carrier, along with electrical power and heat dissipation. In some embodiments, LEDs provided within anti-biofouling module 219 can be embedded in silicone RTV's (WACKER LUMISIL, WACKER CHEMIE AG) operationally for corrosion inhibition. For anti-biofouling, it may be desirable for the fluid within enclosure 102 and/or viewport 114 to be transparent from 260-280 nm in the UV-C, to allow the UV-C light to inhibit the growth of algae and animal matter. In some embodiments, anti-biofouling module 219 may include electronics to control the LEDs, for example by periodically turning them on/off and/or switching between high and low intensity. In other embodiments, controller 110 may be configured to control anti-biofouling LEDs.

Figure 3A:
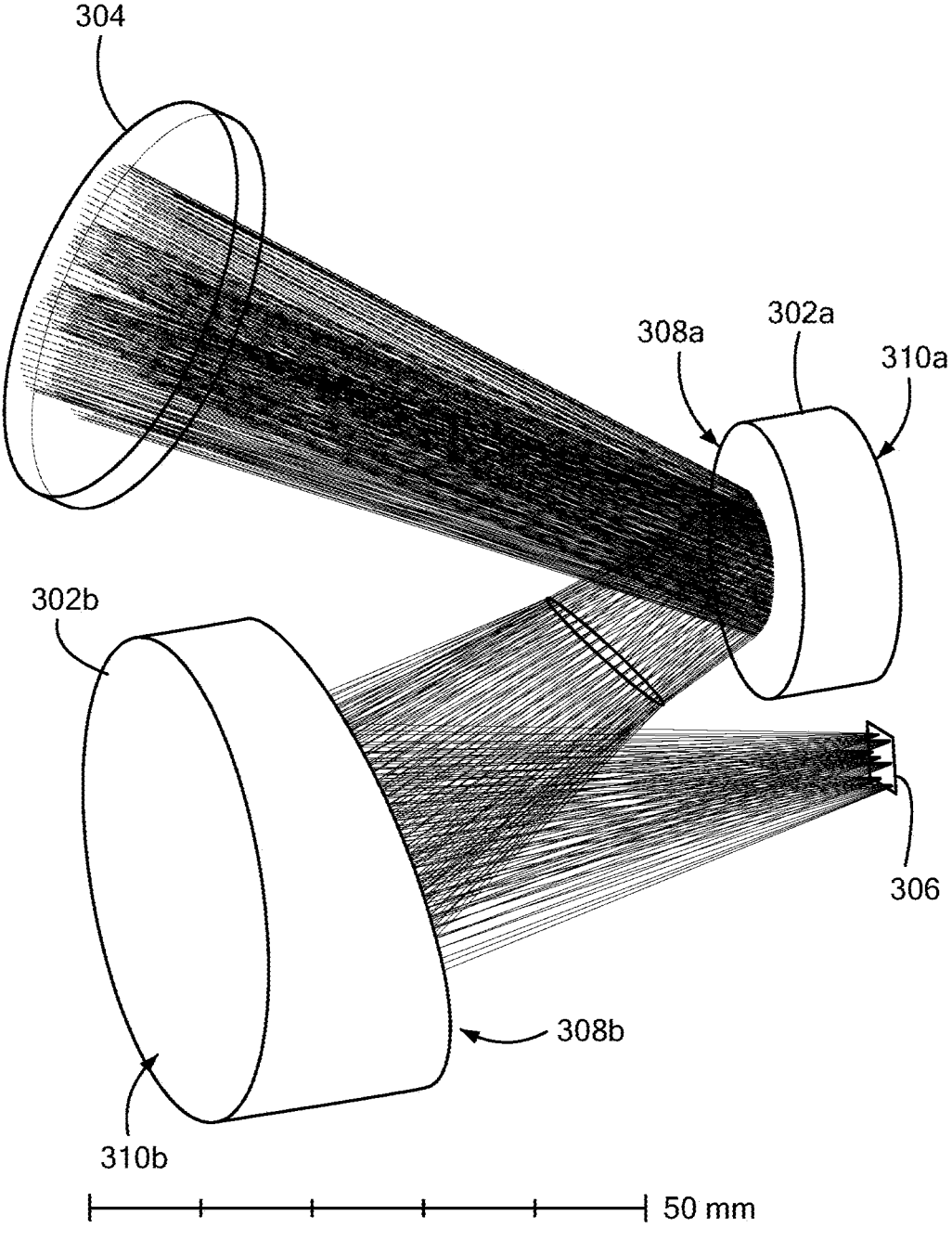
FIGS. 3A and 3B are schematic diagrams showing a freeform optical design that may be used within a pressure tolerant camera system, according to some embodiments.
Figure 3B:
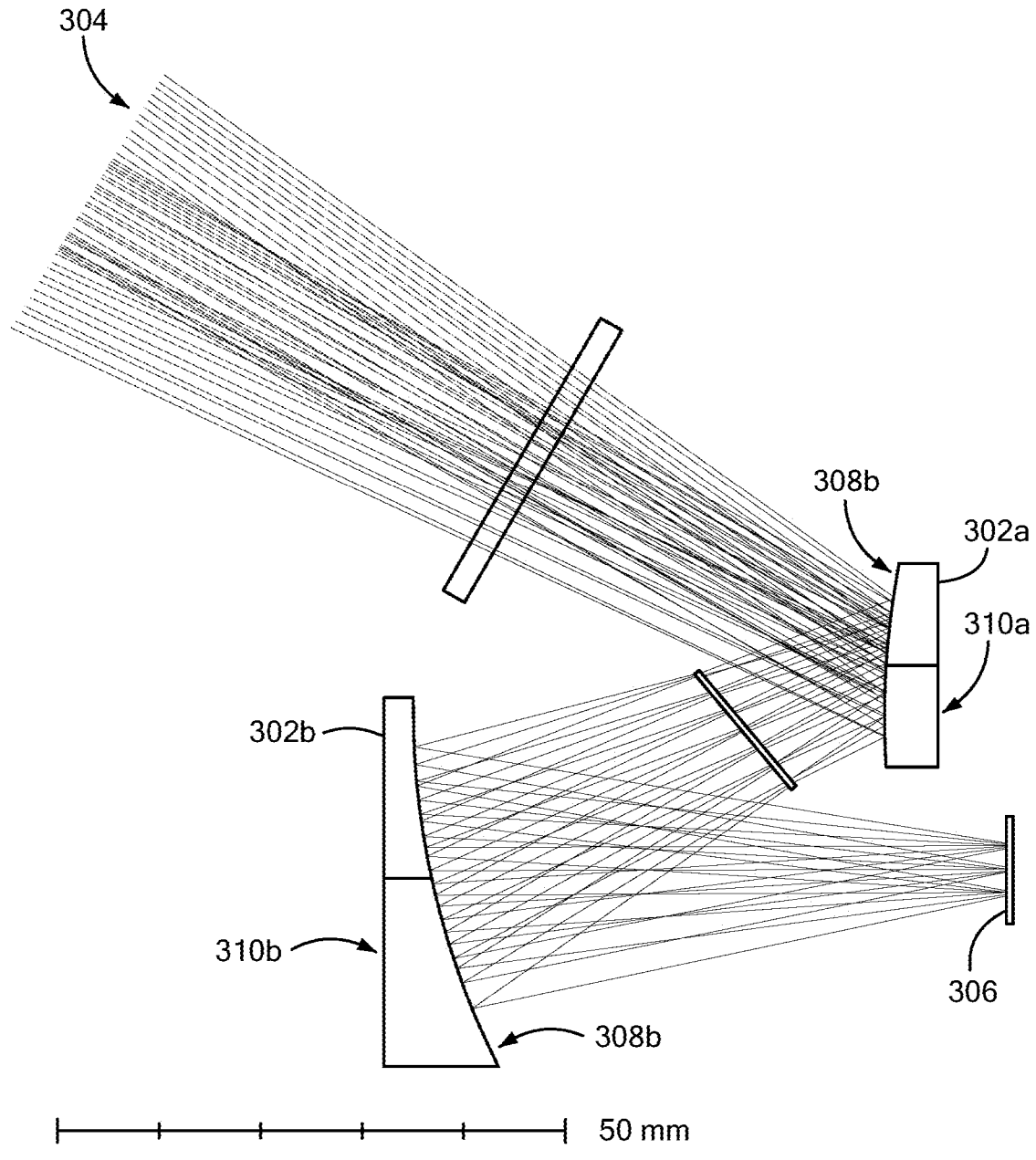

FIGS. 3A and 3B illustrate two-element freeform optical design that may be used within a pressure tolerant camera system, according to some embodiments. For example, the optical design shown may be used within mirror lens system 104 of FIGS. 1 and 2. The described element freeform optical design may provide 16-degree HFOV and fast F/2.5 aperture stop. It is designed to cover the entire field of an off-the-shelf image sensor, such as the SONY IMX477.

As shown in the FIGURES, two freeform mirrors 302a, 302b may be arranged to reflect and focus light entering a camera viewport 304 to a digital image sensor 306. The mirrors 302a, 302a have respective freeform optical surfaces 308a, 308b for reflecting the light and respective flat surfaces 310a, 310b that can be used to mount the mirrors on a rigid structure (not shown). In addition to having different freeform surface designs, the two mirrors 302a, 302b may have different surface areas. For example, in FIGS. 3A and 3B it can be seen that the mirror 302a facing the camera viewport 304 has a smaller freeform surface area (area of surface 308a) compared to mirror 302b facing the image sensor 306 (area of surface 308b). Using a smaller diverging mirror "first" can provide for the wide field-of-view described herein.

The two-element reflector's outstanding performance is enabled by the utilization of "freeform optics" design. The use of freeform optical surfaces 308a, 308b performance, volume, and weight advantages. In some cases, the freeform optical surfaces may be designed to have high-order asymmetrical polynomials, non-uniform rational basis spline (NURBS), or other mathematical representation of odd-even mirror symmetry.

In some embodiments, freeform mirrors may be formed from a metal, glass, or ceramic material then either used with its native reflectivity or overcoated with a material, such as nickel plating with an aluminum or dielectric mirror stack. For mass-production and cost reduction, freeform mirrors may also be made through replicating via a thin epoxy layer on a metal or glass or ceramic material, such as aluminum off of a master mold surface, then subsequently overcoated with a material, such as an aluminum or dielectric mirror stack. In some cases, single point diamond turning may be used (e.g., using a NANOTECH FG350 machine) to produce primary reference mirrors, from which low-cost, high quality, molded mirror replicas can be made. Various freeform mirror designs and fabrication techniques may be used within disclosed pressure tolerant camera systems.

The mirrors 320a, 302b and mounting structure can be submerged in an incompressible fluid to perform the optical focus power and is thus pressure insensitive and tolerant. Moreover, the illustrating optical design eliminates refracting surfaces and, as such, the resulting optical system is insensitive to the refractive index of the surrounding media. The two-mirror design can form a diffraction limited image over a wide angle, 20× more than conventional two-mirror telescopes. It has been shown that this design can provide good lens performance over its field of view.

Figure 4:
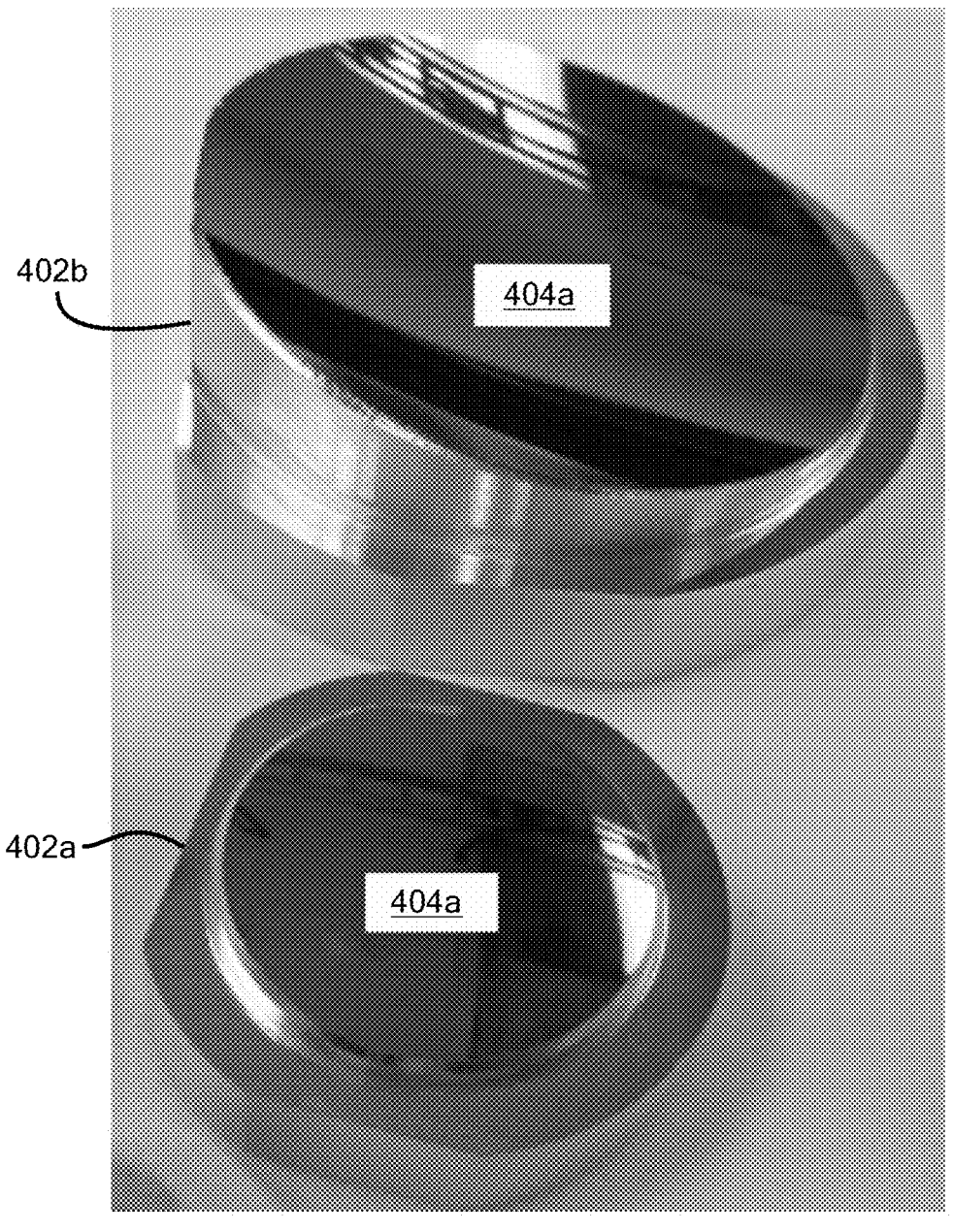
FIG. 4 is a photograph showing an example of freeform mirrors that may be provided within a pressure tolerant camera system, according to some embodiments.

FIG. 4 shows two freeform mirrors 402a, 402b that may be provided within a pressure tolerant camera system, according to some embodiments. As can be seen, the respective freeform surfaces 404a, 404b may be designed to have high-order asymmetrical polynomials.

Figure 5A:
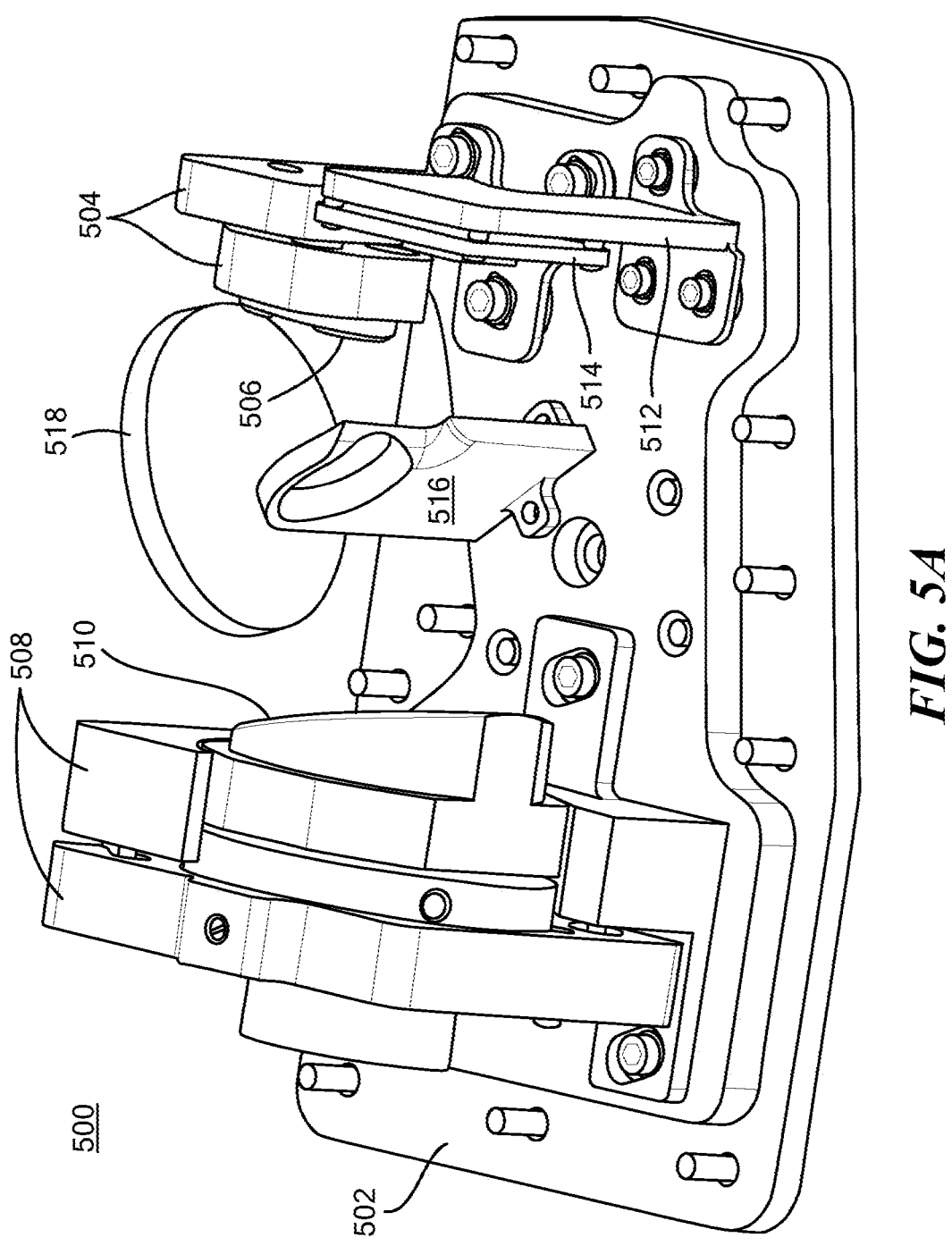
FIG. 5A is a perspective view of a mirror lens assembly that may be provided within a pressure tolerant camera system, according to some embodiments.

FIG. 5A shows an example of a mirror lens assembly 500 that may be provided within a pressure tolerant camera system, according to some embodiments. Illustrative assembly 500 includes a rigid mounting structure comprised of a base plate 502, a first vertical structure 504 to which a first freeform mirror 506 can be mounted, a second vertical structure 508 to which a second freeform mirror 510 can be mounted, and a third vertical structure 512 to which a digital image sensor 514 can be mounted (or, more practically, to which a PCB comprising the image censor can be mounted).

Assembly 500 can further include an aperture stop 516 to restrict the F/# of the optical system. The size of the aperture stop 516 hole can be adjusted to adjust the aperture and collected light. For example, the hole size may be decreased to increase the depth of field.

The vertical structures 504, 508, and 516 may be fastened to the base plate 502 using screws, as shown, or other fastening means. The camera viewport is illustratively represented by disc 518 in the figure. In some examples, the mounting structure (i.e., elements 502, 504, 508, 512, and 516) may be formed from, or coated with, aluminum or other metal. In some examples, the freeform mirrors 506, 510 may be formed of, or coated with, the same or similar material as the mounting structure to execute an athermal design.

Figure 5B:
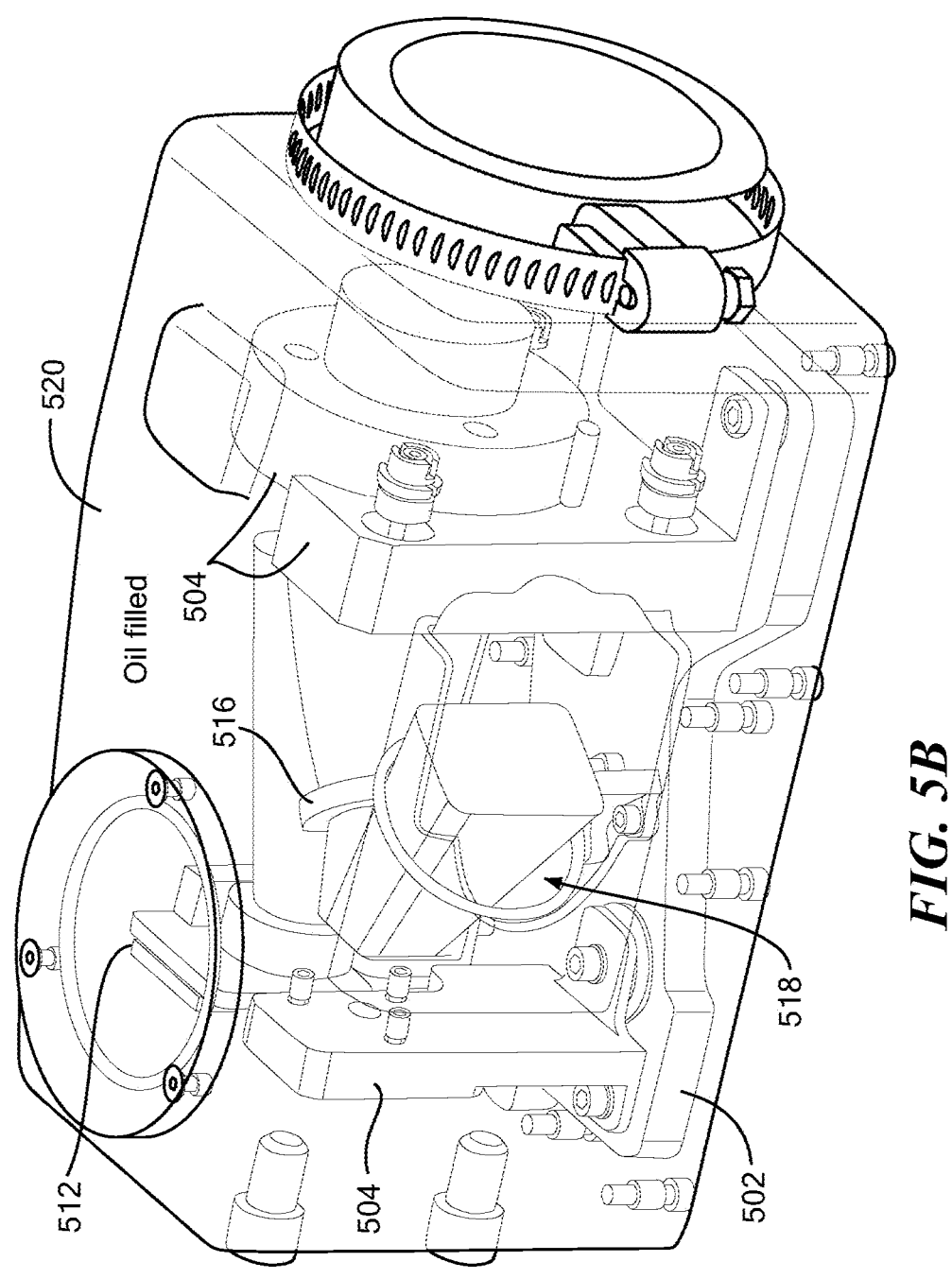
FIG. 5B is a different perspective view of the mirror lens assembly shown within a fluid-filled enclosure, according to some embodiments.

FIG. 5B shows the mirror lens assembly of FIG. 5A provided within a fluid-filled enclosure 520, according to some embodiments. For illustration purposes, enclosure 520 is shown as partially transparent in FIG. 5B.

Figure 5C:
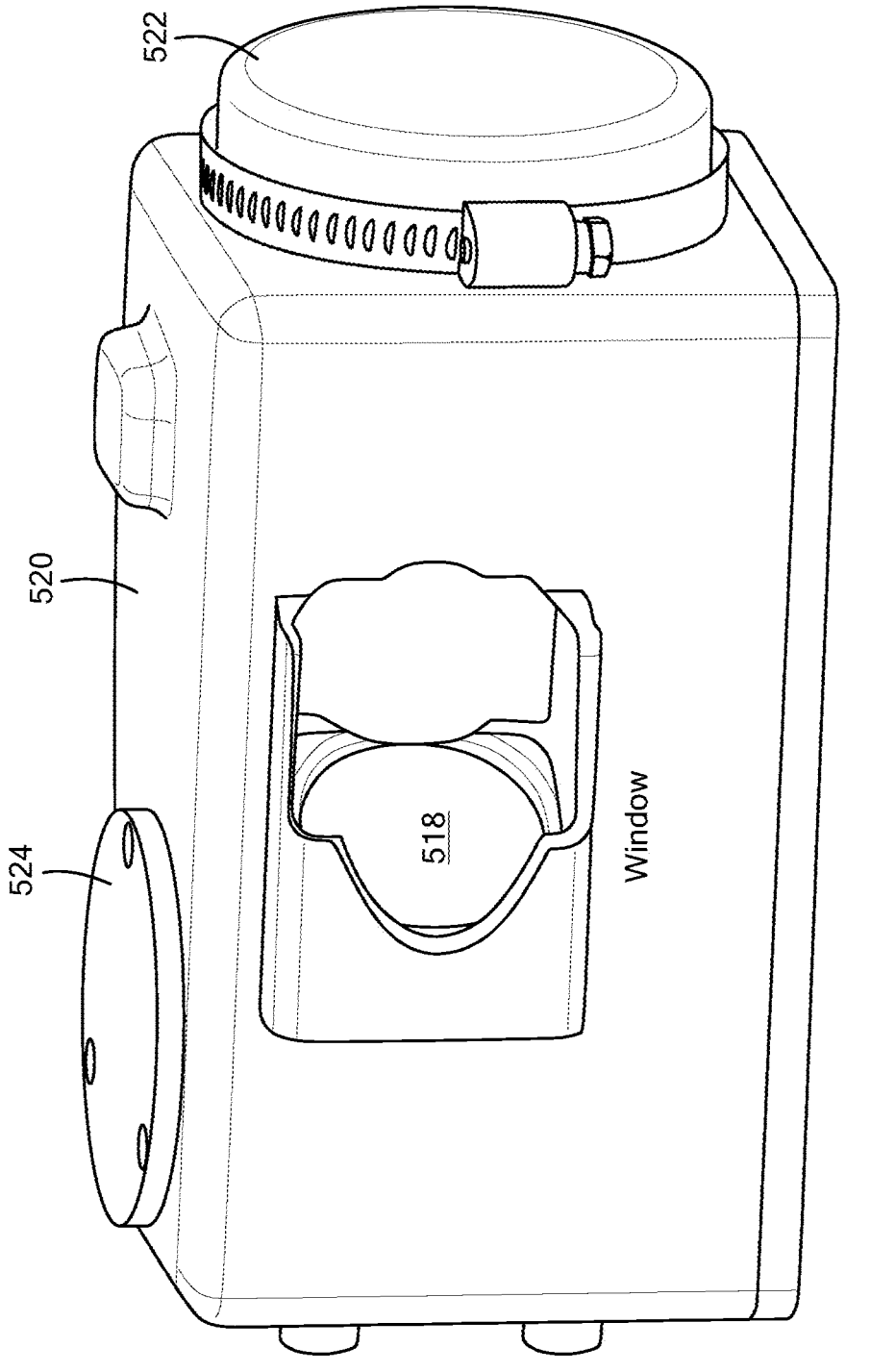
FIG. 5C is a perspective view of a pressure tolerant camera enclosure, according to some embodiments.

FIG. 5C further shows the fluid-filled enclosure 520, according to some embodiments. As can be seen a flexible rubber membrane 522 may be provided at one end of enclosure 520 to allow pressure equalization between inside fluid (e.g., oil) and outside seawater without distorting the enclosure's structure. Other pressure balancing methods such as pistons can be employed here as alternatives. Enclosure 520 can include a removable section 524 (e.g., fasted with screws) for accessing the camera optics and refilling the incompressible fluid. In some embodiments, enclosure 520 can be made to flex in non-critical regions to equalize internal and external forces.

Embodiments of the present disclosure may provide one or more of the following advantages over existing solutions.

Fluid-filled design obviates the need for a structurally-strong pressure vessel due to the isotropic compression of fluids and incompressibility of fluids.

Freeform reflective mirror objective allows wider field and increased aperture while reducing stray light by allowing an internal aperture stop.

Reflective mirror objective lens design is insensitive to the refractive index of the immersion fluid.

Mirror lens allows cost effective diamond turning for fabrication and replication for mass manufacture.

Artificially intelligent camera processors allow in-situ decision making, obviating the need for surfacing the camera to relay time-critical information.

Acoustic signature triggering can reduce false alarms and reduce power consumption.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory, in a digital signal processor (DSP), and/or in a discrete electronic circuit, which can be analog or digital. A processor or controller can include internal processors or modules that perform portions of the function, operation, or sequence of operations. Similarly, a module can include internal processors or internal modules that perform portions of the function, operation, or sequence of operations of the module. A single processor or other unit may fulfill the functions of several means recited in the claims.

As used in the claims or elsewhere herein, the term "comprising" does not exclude other elements or steps, and the indefinite article "a" or "an" does not exclude a plurality.

Subject matter described herein can be implemented in digital electronic circuitry, or in computer software, firmware, or hardware, including the structural means disclosed herein and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Although reference is made herein to particular materials, it is appreciated that other materials having similar functional and/or structural properties may be substituted where appropriate, and that a person having ordinary skill in the art would understand how to select such materials and incorporate them into embodiments of the concepts, techniques, and structures set forth herein without deviating from the scope of those teachings.

Various embodiments of the concepts systems and techniques are described herein with reference to the related drawings. Alternative embodiments can be devised without departing from the scope of the described concepts. It is noted that various connections and positional relationships (e.g., over, below, adjacent, etc.) are set forth between elements in the claims, detailed description, and drawings. These connections and/or positional relationships, unless specified otherwise, can be direct or indirect, and the claimed inventions are not intended to be limiting in this respect. Accordingly, a coupling/connection of entities can refer to either a direct or an indirect coupling/connection, and a positional relationship between entities can be a direct or indirect positional relationship. As an example of an indirect positional relationship, references in the present description to element or structure A coupled/connected to element or structure B include situations in which one or more intermediate elements or structures (e.g., element C) is provided between elements A and B regardless of whether the characteristics and functionalities of elements A and/or B are substantially changed by the intermediate element(s).

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the detailed description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

Other variations to the disclosed embodiments can be understood and effected by those skilled in the art in practicing the claimed invention, from a study of the drawings, the disclosure, and the appended claims.

The mere fact that certain measures are recited in mutually different dependent claims does not indicate that a combination of these measures cannot be used to obtain an advantage.

Any reference signs in the claims should not be construed as limiting the scope.

All publications and references cited herein are expressly incorporated herein by reference in their entirety.

The invention claimed is:

1. A pressure tolerant camera system comprising:
an enclosure filled with an incompressible fluid and having a viewport through which light can pass;
a digital image sensor provided within the enclosure;
a plurality of mirror lenses provided within the enclosure and arranged to reflect light from the viewport onto the digital image sensor; and
a support structure to hold the plurality of mirror lenses in place.

2. The camera system of claim 1 wherein at least one of the plurality of mirror lenses has a freeform optical surface.

3. The camera system of claim 2 wherein the freeform optical surface includes at least one of:
high-order asymmetrical polynomials;
non-uniform rational basis spline (NURBS); or
other mathematical representation of odd-even mirror symmetry.

4. The camera system of claim 1 wherein the plurality of mirror lenses include two mirror lenses both having a freeform optical surface.

5. The camera system of claim 4 wherein the two mirror lenses are configured to perform optical focus power.

6. The camera system of claim 1 wherein one or more of the plurality of mirror lenses is formed of a metal, glass, or ceramic.

7. The camera system of claim 1 wherein the incompressible fluid is transparent in a visible light waveband.

8. The camera system of claim 1 wherein the incompressible fluid is one of distilled water, ethanol, food-grade mineral oil, silicone oil, or an engineered fluid.

9. The camera system of claim 1 wherein the mirror lenses and the support structure are formed of a common material.

10. The camera system of claim 9 wherein the common material is aluminum.

11. The camera system of claim 1 wherein the plurality of mirror lenses are substantially insensitive to a refractive index of the incompressible fluid.

12. The camera system of claim 1 further comprising:
a controller configured to execute one or more artificial intelligence (AI) algorithms.

13. The camera system of claim 12 wherein the AI algorithms are operable to recognize one or more underwater objects.

14. The camera system of claim 13 further comprising a memory, wherein the controller is configured to store, to the memory, image data obtained from the plurality of mirror lenses and image sensor in response to recognition of specific underwater objects.

15. The camera system of claim 1 further comprising an anti-biofouling module configured to generate ultraviolet (UV) light for inhibiting biofouling of the viewport.

16. The camera system of claim 1 wherein the enclosure has a flexible rubber membrane to equalize pressure between the enclosure filled with the incompressible fluid and an external environment.

17. A pressure tolerant camera system comprising:

an enclosure configured to be filled with an incompressible fluid and having a viewport through which light can pass;

a plurality of freeform mirror lenses provided within the enclosure and arranged to reflect light from the viewport onto a digital image sensor; and a support structure to hold the plurality of freeform mirror lenses in place.

18. An unmanned underwater vehicle (UUV) comprising:

a pressure tolerant camera system having one or more freeform mirror lenses and a digital image sensor all provided within a fluid-filled enclosure; and a controller configured to make autonomous decisions regarding operation of the UUV using data generated by the pressure tolerant camera system.

19. The camera system of claim 17 wherein the plurality of freeform mirror lenses are substantially insensitive to a refractive index of the incompressible fluid.

20. The camera system of claim 17 further comprising an anti-biofouling module configured to generate ultraviolet (UV) light for inhibiting biofouling of the viewport.

\* \* \* \* \*